No. 654,110.  
G. E. COREY.  
CHECKREIN ATTACHMENT.  
(Application filed Feb. 20, 1899.)  
Patented July 17, 1900.

(No Model.)

WITNESSES.  
D. E. Carlsen  
B. B. Bienhoff

INVENTOR.  
George E. Corey.  
By his ATTORNEY:  
A. M. Carlsen.

THE NORRIS PETERS CO., PHOTO-LITHO., WASHINGTON, D. C.

UNITED STATES PATENT OFFICE.

GEORGE E. COREY, OF MADISON, MINNESOTA, ASSIGNOR TO ABBIE E. COREY, OF SAME PLACE.

CHECKREIN ATTACHMENT.

SPECIFICATION forming part of Letters Patent No. 654,110, dated July 17, 1900.

Application filed February 20, 1899. Serial No. 706,149. (No model.)

*To all whom it may concern:*

Be it known that I, GEORGE E. COREY, a citizen of the United States, residing at Madison, in the county of Lac Qui Parle and State of Minnesota, have invented certain new and useful Improvements in Attachments for Checkreins; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in yielding attachments for checkreins for horses; and the object of my invention is to provide an improved device of this class which is simple, effective, and ornamental and which may be attached in its working position without danger of getting one or more unsightly twists on it, as is often the case with other checkreins when the rear end thereof is put on the hook of the saddle in a hurry. This object I attain by the novel construction and arrangement of parts illustrated in the accompanying drawings, in which—

Figure 1:
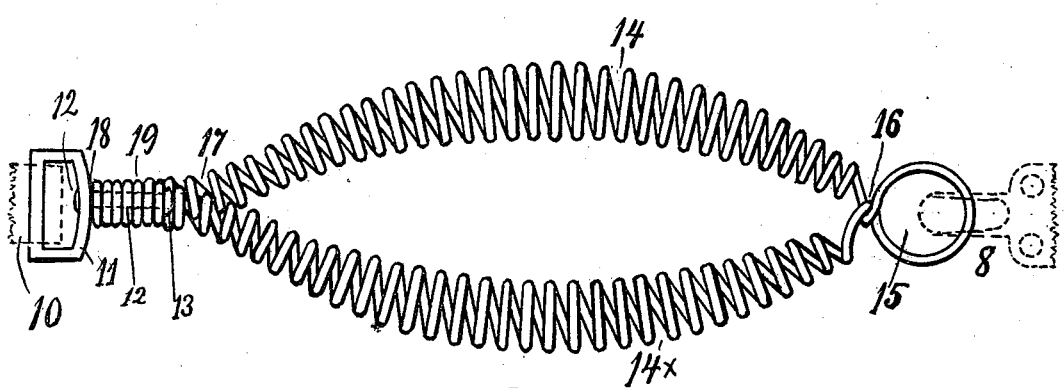
Figure 2:
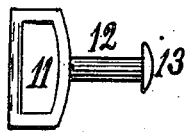
Figure 3:
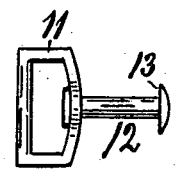

Figure 1 is a top or plan view of the attachment loosely inserted between and attached to portions of the checkrein and the saddle-hook, both shown in dotted lines. Fig. 2 is a detail view of the swiveling eye or loop at the left-hand end of Fig. 1. Fig. 3 is a modification of the loop in Fig. 2.

Referring to the drawings by reference-numerals, 8 designates the regular checkrein-hook secured on the saddle of the harness.

10 is the rear end of the checkrein, to which I secure the somewhat D-shaped loop 11, which may swivel on the stem 12, as in Fig. 3, or may be made integral with the stem, as in Fig. 2. In either case the loop is permitted to swivel either on or with the stem 12, which is provided with the head 13.

14 14ˣ represent a spiral spring bent at its middle and doubled or returned upon itself. The bend is formed into a loop 15, which is adapted to go on the hook 8, and near the said loop the wires are twisted at 16 to keep the loop and the halves 14 and 14ˣ of the spring from spreading, and thereby injure the loop. The spring may, however, also be made without said twist. The ends of the spring are brought together and with the coils in between each other, as from 17 to 18 in Fig. 1, and are finally brought to a common center and reduced in diameter until they form a journal 19 about the neck 12, the head 13 of which takes hold beyond the inner end of said journal, as indicated in dotted lines in Fig. 1.

In using this device the swivel-loop 11 is secured to the rear end of the checkrein 10, and whenever it is desired to use the checkrein the loop 15 is thrown upon the hook 8, either side up, and if there are any twists on the rein the swivel-joint at 12 19 will permit the strain on the rein to throw the twist off, or, if so preferred, a touch of the hand will take off the twist in an instant and without the bother of removing the stretched rein from the hook 8.

The ring or loop 11 and its shank or stem 12 and head 13 may all be made in one piece very cheaply by drop-forging or stamping it out, and the spring is another single piece of metal cheaply but ornamentally and in a strength-increasing manner formed into a double spring with the journal 19, the ring or loop 15, and the means 16 for holding the loop 15 and the spring in shape, so that the entire attachment may be made very cheaply from only two small pieces of metal.

I am aware that it is old to provide checkreins with yielding attachments, so I do not claim such device broadly; but What I do claim as my invention, and desire to secure by Letters Patent, is—

1. As an improved article of manufacture, the herein-described attachment for checkreins, comprising a spiral spring bent at its middle so as to double upon itself, and at the bend having the loop or eye 15 with the twist 16; the ends of the spring being brought together and secured to a swiveling ring adapted to be secured to the rear end of the checkrein, substantially as and for the purposes set forth.

2. As an improved article of manufacture, the herein-described attachment for checkreins, consisting of a spiral spring bent in the middle so as to double upon itself, and having its bend formed into a loop adapted to be placed on the checkrein-hook on the saddle of the harness, and a swivel-eye secured to a journal formed of the gathered ends of the doubled spring, said eye being adapted to receive and have fastened to it the rear end of the check-rein, substantially as set forth.

3. As an improved article of manufacture, a checkrein attachment comsprising a single coil-spring bent in the middle to fold upon itself, and having its bend twisted as at 16 and formed into the loop 15 adapted to be placed on the checkrein-hook on the saddle of the harness, the ends of the spring being brought together, reduced in diameter and placed with the coils alternately between the coils of each other and brought to a common center for some distance to form a journal, and a swivel-eye having a headed stem revolubly secured in said journal for securing the checkrein to.

In testimony whereof I affix my signature in presence of two witnesses.

GEORGE E. COREY.

Witnesses:
   J. N. JOHNSON,
   FRANK WILLIS.